United States Patent
Jang et al.

(10) Patent No.: US 9,921,336 B2
(45) Date of Patent: Mar. 20, 2018

(54) DEVICE AND METHOD FOR RECOGNIZING 3D POSTURE AND LOCATION OF A MOVABLE BODY

(71) Applicant: Polariant, Inc., Seoul (KR)

(72) Inventors: Hyouk Jang, Seoul (KR); Hyeon Gi Jeon, Cheongju (KR); Youngjae Choi, Seoul (KR)

(73) Assignee: Polariant, Inc., Seoul (KR)

( * ) Notice: Subject to any disclaimer, the term of this patent is extended or adjusted under 35 U.S.C. 154(b) by 0 days.

(21) Appl. No.: 15/498,716

(22) Filed: Apr. 27, 2017

(65) Prior Publication Data

US 2017/0276830 A1 Sep. 28, 2017

Related U.S. Application Data

(63) Continuation-in-part of application No. PCT/KR2015/012813, filed on Nov. 27, 2015.

(30) Foreign Application Priority Data

Nov. 28, 2014 (KR) ........................ 10-2014-0168795

(51) Int. Cl.
*G01J 4/00* (2006.01)
*G01V 8/20* (2006.01)
*H04W 4/02* (2018.01)

(52) U.S. Cl.
CPC ................ *G01V 8/20* (2013.01); *H04W 4/02* (2013.01)

(58) Field of Classification Search
CPC .................................... G01V 8/20; G01J 4/00
USPC ......................................................... 356/364
See application file for complete search history.

(56) References Cited

U.S. PATENT DOCUMENTS

2017/0102449 A1* 4/2017 Jang ........................ G01S 5/16

* cited by examiner

*Primary Examiner* — Roy M Punnoose
(74) *Attorney, Agent, or Firm* — John H. Choi & Associates LLC

(57) ABSTRACT

Accordingly the embodiment herein provides a device for recognizing a 3D posture and a location of a movable body. The device includes: a plurality of polarization modules individually attached to a plurality of surfaces of a 3D figure; a plurality of illumination modules individually corresponding to the polarization modules and generating and outputting illumination value information in which polarized light emitted from a polarization light source penetrates the corresponding polarization module to be received; and an interpretation unit generating posture information and location information of the movable body by using the illumination value information received from the illumination modules corresponding to the polarization modules attached to at least three considered target surfaces.

10 Claims, 5 Drawing Sheets

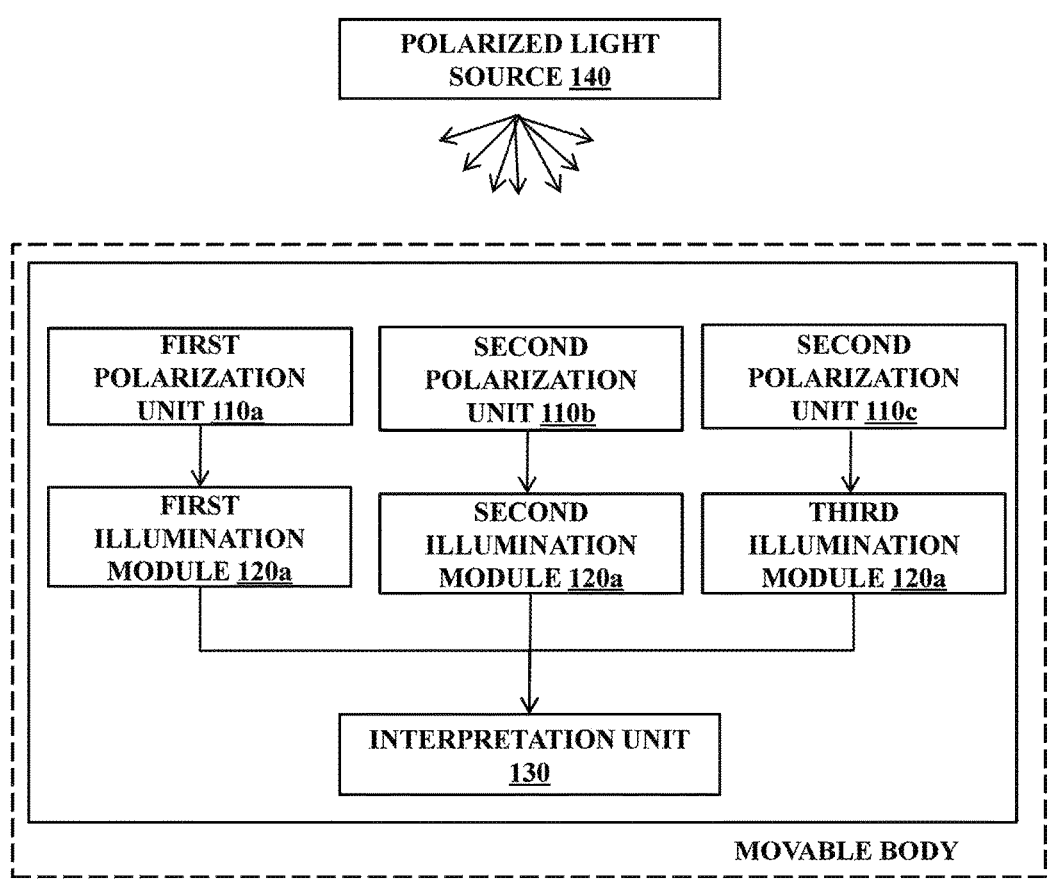

DEVICE AND METHOD FOR RECOGNIZING 3D POSTURE AND LOCATION OF A MOVABLE BODY

CROSS-REFERENCE TO RELATED APPLICATIONS

This application is a continuation-in-part of International Application No. PCT/KR2015/012813, filed on Nov. 27, 2015, which claims priority to Korean Patent Application No. 10-2014-0168795, filed on Nov. 28, 2014. This application claims priority to and the benefit of the aforesaid applications, the entire contents of which are incorporated herein by reference.

TECHNICAL FIELD

The present invention relates to location based system, more particularly a device for recognizing a 3D posture and a location of a movable body.

BACKGROUND

A Location Based Service (LBS) is used to determine a location of a user through a location estimation technique and provides various information or services based on result of the determination. With the advent of smart phones and smart electronic devices, research into the location based service has been in active progress. Such smart phones and smart electronic devices comprises functions of a Global Positioning System (GPS), a terrestrial magnetic sensor, a camera, an Radio-frequency identification (RFID), or the like to provide various services and functionalities to the user.

The location based service researched in the related art primarily relates to an outdoor localization system such as a location estimation technique using the GPS and a mobile communication network, and a location estimation technique based on a pattern matching algorithm of a wireless LAN signal pattern, or the like.

However, the outdoor localization system is not suitable in an indoor environment as high accuracy is required to estimate the location. Due to influences such as signal interference by an indoor structure such as a wall, or the like, accurately estimating the location difficult in the indoor environment.

Korean Patent Publication No. 2014-0055109 (Apparatus and Method for Identifying Location of Mobile Node) discloses a technology that recognizes a location of a mobile node by using information on strength of a received signal transmitted from one or more reference nodes to a mobile node.

Korean Patent Publication No. 2014-0066570 (System and Method for Navigation) discloses a technology that attaches a barcode including identification information to a predetermined point indoors and recognizes and presents at which location a user is present in an indoor map by recognizing the barcode.

As described above, various technologies are developed for accurately estimating the location of the user positioned in indoor environment for various purposes such as the location based service, visitor location tracking, or the like.

However, since the location recognition technology can determine only a location at which the user is positioned in an indoor space and cannot verify at which degree and in which direction the user views at the location, there is a limit in that the location based service considering the location and a viewing direction of the user.

SUMMARY OF INVENTION

The present invention has been made in an effort to provide a device for recognizing a 3D posture and a location of a movable body which can accurately determine a posture (for example, an opposing direction and a viewing direction depending on an inclination angle) and a location of a movable body in a 3D space by using a polarized light characteristic. The determined posture and location of the movable body can be used to provide various services such as a location based service, or the like.

Accordingly the embodiments herein provide a device for recognizing a 3D posture and a location of a movable body. The device including a plurality of polarization modules individually attached to a plurality of surfaces of a 3D figure. Further the device includes a plurality of illumination modules, individually corresponding to the polarization modules, configured to generate and output illumination value information in which polarized light emitted from a polarization light source penetrates the corresponding polarization module to be received. Furthermore, the device includes an interpretation unit configured to generate posture information and location information of the movable body by using the illumination value information received from the illumination modules corresponding to the polarization modules attached to at least three considered target surfaces. Where a condition has to met, in which three considered target surfaces selected among the plurality of surfaces of the 3D figure exist at a location to which the light emitted from the polarization light source is irradiated and an area vector of the other one considered target surface is not made through synthesis of the area vectors of two other considered target surfaces.

In an embodiment, each of the plurality of polarization modules includes a plurality of polarization units in which optical transmission axes are set differently from each other.

In an embodiment, generate the posture information of the movable body includes rotate an acquired polarization surface formed by the polarized light emitted from the polarization light source in the 3D figure at an inclination angle Tp in a 3D space so as to coincide with a pre-stored reference polarization surface, and generate the posture information of the movable body by using an equation given below, which uses the illumination value information for two considered target surfaces among the three considered target surfaces, $$\frac{\begin{bmatrix} A_1\cos\theta - B_1\sin\theta \\ B_1\cos\theta + A_1\sin\theta \\ C_1 \end{bmatrix} \cdot \vec{l}}{\begin{bmatrix} A_2\cos\theta - B_2\sin\theta \\ B_2\cos\theta + A_2\sin\theta \\ C_2 \end{bmatrix} \cdot \vec{l}} = \frac{s_1}{s_2}$$

where $\vec{l}$ represents direction vector of introduced polarized light, s1 represents an illumination value measured with respect to a first considered target surface, $(A_1, B_1, C_1)$ represents an area vector of a first considered target surface after rotating as the inclination angle Tp, s2 represents measured illumination value of a second considered target surface, and $(A_2, B_2, C_2)$ represents the area vector of the second considered target surface after rotating at the inclination angle Tp, and θ represents a rotational angle indicating the posture information of the movable body.

In an embodiment, generate the location information of the movable body includes rotate an acquired polarization surface formed by the polarized light emitted from the polarization light source in the 3D figure at an inclination angle Tp in a 3D space so as to coincide with a pre-stored reference polarization surface, and generate the positional information of the movable body by using an equation given below, which uses the illumination value information for three considered target surfaces, $$s_i = \frac{kz}{\sqrt{A_i^2 + B_i^2 + C_i^2} \, (x^2 + y^2 + z^2)^2} (A_i x + B_i y + C_i z)$$

where i is designated as 1, 2, or 3 corresponding to each of three considered target surfaces, k represents a predetermined constant, $(A_i, B_i, C_i)$ represents area vector of three considered target surfaces, (x, y, z) represent the location information of the movable body when a location coordinate of the polarization light source is designated as (0, 0, 0), and $s_i$ represents an illumination value of each of the three considered target surfaces.

In an embodiment, the 3D figure is a concrete 3D figure attached to the movable body to which the polarization module is attached, wherein the 3D figure is a virtual 3D figure formed by virtually extending each considered target surface to which the polarization module is attached.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE FIGURES

This invention is illustrated in the accompanying drawings, throughout which like reference letters indicate corresponding parts in the various figures. The embodiments herein will be better understood from the following description with reference to the drawings, in which:

FIG. 1 is a block diagram illustrating a configuration of an information recognition device of a movable body, according to an embodiment of the present invention;

FIGS. 2A to 5 are diagrams for describing a recognition technique of a posture and a location in a 3D space in the information recognition device of a movable body according to the exemplary embodiment of the present invention. More specifically, FIG. 2A is an illustration of a 3D figure of a movable body;

FIG. 4 is an illustration of a virtual cutting surface of the present invention; and FIG. 5 is an illustration of a polarization light source in relation to a target surface.

DETAILED DESCRIPTION OF INVENTION

Figure 2A:
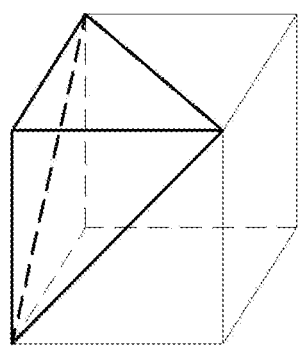

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

It should be understood that, when it is described that a component is "connected to" or "accesses" another component, the component may be directly connected to or access the other component or a third component may be present therebetween. In contrast, it should be understood that, when it is described that an element is "directly connected to" or "directly access" another element, it is understood that no element is present between the element and another element.

Terms used in the present specification are used only to describe specific embodiments, and are not intended to limit the present invention. Singular expressions used herein include plural expressions unless they have definitely opposite meanings in the context. In the present specification, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Terms such as first, second, and the like may be used to describe various components and the components should not be limited by the terms. The terms are used only to discriminate one constituent element from another component.

In addition, terms including "part', "unit", "module", and the like disclosed in the specification mean a unit that processes at least one function or operation and this may be implemented by hardware or a combination of hardware and software.

Components of the embodiment described with reference to each drawing are not limitedly applied only to the corresponding embodiment and may be implemented to be included in another embodiment within a scope in which the technical spirit of the present invention is maintained and further, although separate description is omitted, the components may be implemented as one embodiment in which a plurality of embodiments are integrated again, of course.

Embodiments of the present invention will be described in detail with reference to the accompanying drawings, in which like or related reference numerals refer to like elements regardless of reference numerals and a duplicated description thereof will be omitted. In describing the present invention, when it is determined that the detailed description of the publicly known art related to the present invention may unnecessarily obscure the gist of the present invention, the detailed description thereof will be omitted.

Accordingly the embodiments herein provide a device for recognizing a 3D posture and a location of a movable body. The device including a plurality of polarization modules individually attached to a plurality of surfaces of a 3D figure. Further the device includes a plurality of illumination modules, individually corresponding to the polarization modules, configured to generate and output illumination value information in which polarized light emitted from a polarization light source penetrates the corresponding polarization module to be received. Furthermore, the device includes an interpretation unit configured to generate posture information and location information of the movable body by using the illumination value information received from the illumination modules corresponding to the polarization modules attached to at least three considered target surfaces. Where a condition has to met, in which three considered target surfaces selected among the plurality of surfaces of the 3D figure exist at a location to which the light emitted from the polarization light source is irradiated and an area vector of the other one considered target surface is not made through synthesis of the area vectors of two other considered target surfaces.

Referring now to the drawings and more particularly to FIGS. 1 to 5 where similar reference characters denote corresponding features consistently throughout the figures, there are shown preferred embodiments.

FIG. 1 is a block diagram schematically illustrating a configuration of an information recognition device of a movable body according to an embodiment of the present invention and FIGS. 2 to 5 are diagrams for describing a recognition technique of a posture and a location in a 3D space in the information recognition device of a movable body, according to the exemplary embodiment of the present invention.

Referring to the FIG. 1, a device recognizing a movable body information is provided at one side of a movable body and may include a recognition unit 100 that analyzes movable body information. The movable body information described herein includes posture information (for example, rotational angle information in a 3D space of a space coordinate system constituted by X, Y, and Z axes) and location information in the 3D space by receiving light irradiated from a polarized light source 140.

For example, if the movable body has a capability of moving in a space by its own power, the movable body may further include components (not illustrated) for example, a wheel, a motor, or the like. For example, if the movable body is a shopping cart, it may have wheels. Or if the movable body is a drone, it may have motors and wings. Further, the movable body may be formed in shapes including a cap, a badge, or the like which are worn on a person and move together with movement of the person. Further, the shape of the movable body may be diversified.

The polarized light source 140, as means for irradiating polarized light, may be configured to include a polarization unit and a light source. The polarized light source 140 may be implemented by, for example, a light source body to which a polarization film is attached, a light source body in which a polarization lamp and a polarization filter are installed, or the like. The polarization unit (that is, a member such as a polarization film, or the like provided for polarization processing) included in the polarized light source 140 may be referred to as a 'light source polarization unit' to distinguish from first to third polarization modules 110*a*, 110*b*, and 110*c* respectively of the recognition unit 100 as described below. Further, the light source may be a lighting device, for example, pendant ceiling lighting disposed on the top of an indoor space.

In this case, the light source polarization unit may be installed so that a transmission axis suitable for a predetermined orientation (for example, a direction of a phase angle 0° as a north-top direction) is formed and information thereon may be stored and managed in a storage unit (not illustrated) provided in the movable body information recognition device.

The recognition unit 100 may include a first polarization module 110*a*, a second polarization module 110*b*, a third polarization module 110*c*, a first illumination module 120*a*, a second illumination module 120*b*, a third illumination module 120*c*, and an interpretation unit 130. The recognition unit 100 may further include a storage unit (not illustrated) for storing data required for interpreting posture and location information of the movable body.

The recognition unit 100 may be formed at or attached onto one side of the movable body in order to recognize the movable body information (such as the posture information and location information). However, when the recognition unit 100 is provided at one side of the movable body, the pose detection unit 100 is disposed at a location in which light may flow from the polarized light source 140, of course.

For reference, in the present specification, the term 'posture' should be interpreted as, for example, a term including a rotational state corresponding to rotational angle information in the 3D space of the space coordinate system constituted by the X, Y, and Z axes. The recognition unit 100 may recognize which posture the movable body takes by interpreting in which direction and at which degree the movable body rotates and at which degree the movable body is inclined in a vertical direction.

In the FIG. 1, a case is illustrated, in which the interpretation unit 130 generating information on the pose of the movable body is included in the recognition unit 100, but the interpretation unit 130 may be included in an independent device which the recognition unit 100 accesses through a communication network. In such case, the recognition unit 100 will include a transmitting unit for transmitting illumination value information measured by the first to third illumination modules 120*a*, 120*b*, and 120*c* to a device including the interpretation unit 130. However, in the present specification, a component including the first to third polarization modules 110*a*, 110*b*, and 110*c*, the first to third illumination modules 120*a*, 120*b*, and 120*c*, and the interpretation unit 130 respectively will be referred to as the recognition unit 100 regardless of a location of the interpretation unit 130 for easy description.

In the present specification, when mutual distinguishment is not required, the first to third polarization modules 110*a*, 110*b*, and 110*c* may be collectively referred to as the polarization module 110 and the first to third illumination module 120*a*, 120*b*, and 120*c* may be collectively referred to as the illumination module 120.

As illustrated in FIGS. 2A-2D, each of the first to third polarization modules 110a, 110b, and 110c is positioned on each surface of a 3D figure formed in the 3D space. The 3D figure at which each polarization module 110 will be positioned may be a 3D figure having a concrete shape and when surfaces of the respective polarization modules 110 are virtually extended. The 3D figure may be a 3D figure in which the extended surfaces are connected to each other to be virtually formed.

However, the 3D figure having surfaces (hereinafter, may be referred to as 'considered target surface') on which the respective polarization modules 110 will be individually attached. The considered target surface needs to satisfy a first condition and a second condition. In the first condition, at least three considered target surfaces need to have a location and an angle to receive light irradiated from the polarization light source 140. In the second condition, area vectors of three considered target surfaces to which the respective polarization modules which will provide illumination value information required for interpretation of the interpretation unit 130 are attached has independency that the area vector of the other one considered target surface is not made through synthesis of the area vectors of two other considered target surfaces.

Figure 2B:
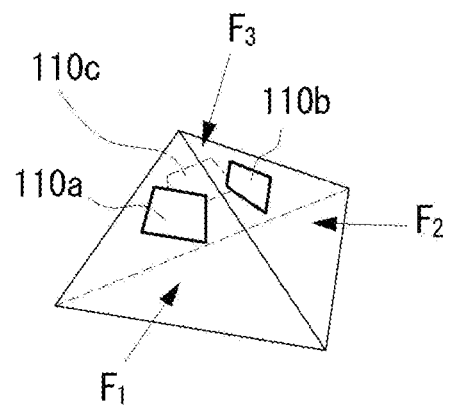
FIG. 2B is an illustration of polarization modules of the present invention.

For example, the 3D figure may be a right-angled tetrahedron cut around three apexes of a regular hexahedron which are not adjacent to each other as illustrated in the FIG. 2A and one polarization module may be attached to each of three residual surfaces (that is, reference numerals F1, F2, and F3 which are the considered target surfaces) other than a base side as illustrated in the FIG. 2B.

Of course, in spite of a form in which the three considered target surfaces to which the polarization modules 110 are attached are not physically adjacent to each other, if the form just satisfies a forming condition of the 3D figure, the 3D figure may be determined to have a virtual 3D figure and/or a configuration of a polyhedron having different forms.

The number of surfaces to which the polarization modules 110 are attached, respectively may be three or more. Three surfaces described herein are among the surfaces that satisfy the forming condition of the 3D figure which may be determined as the considered target surfaces. The movable body information may be interpreted by using the illumination value information input from the illumination module 120 corresponding to the polarization modules 110 attached to the determined three surfaces.

Figure 2C:
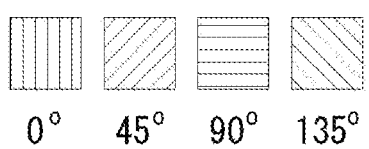
FIG. 2C is an illustration of polarization units of the present invention.
Figure 2D:
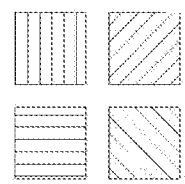
FIG. 2D is another illustration of polarization units of the present invention.

The polarization module 110 attached to each surface may be configured to include a plurality of polarization units as illustrated in each of the FIGS. 2C and 2D and optical transmission axes of the respective polarization units may be set differently as 0 degree, 45 degrees, 90 degrees, 135 degrees, or the like. Further, an illuminometer corresponding to each polarization unit is included in the illumination module 120 to generate the illumination value information depending on light transmitting each polarization unit.

As a layout shape of the plurality of polarization units included in the polarization module 110, 1×4 and 2×2 are illustrated in the FIGS. 2C and 2D, but the number of and the layout shape of polarization units included in the polarization module 110 are not limited thereto, of course.

Hereinafter, a posture candidate group determining process of the movable body using light received by transmitting the illumination module 120 will be described with reference to the FIGS. 3A-3C.

Figure 3A:
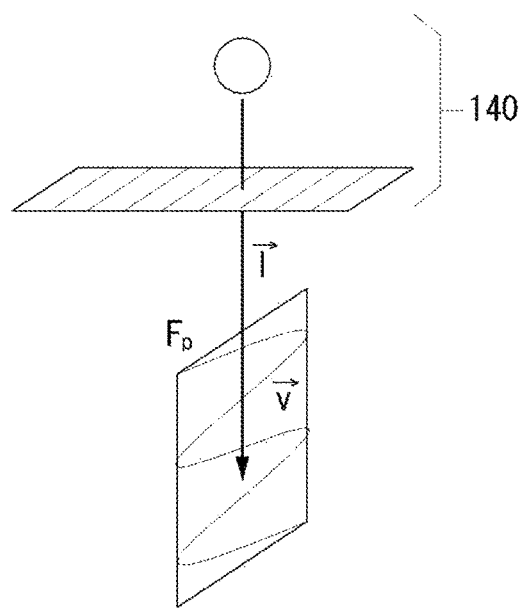
FIG. 3A is an illustration of a conceptual shape of light irradiated from a polarization light source.

The FIG. 3A illustrates a conceptual shape of light irradiated from the polarization light source 140 (polarization surface Fp). That is, the light irradiated from the light source is polarized and emitted according to the optical transmission axis of the light source polarization unit. $\vec{l}$ of the FIG. 3A represents a direction vector in which the light is emitted, $\vec{v}$ represents a vibration direction of the light polarized by transmitting the light source polarization unit, and Fp represents a polarization surface which is a plane including and $\vec{l}$ and $\vec{v}$.

Figure 3B:
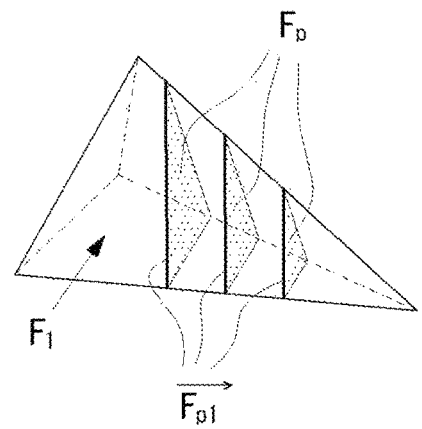
FIG. 3B is an illustration of a virtual polarization surface formed on a 3D figure.
Figure 3C:
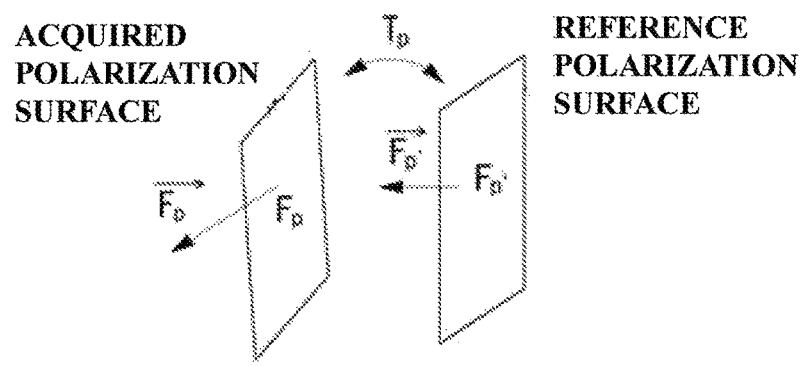
FIG. 3C is an illustration of an acquired polarization surface and reference polarization surface.

A virtual polarization surface Fp is formed on the 3D figure as illustrated in the FIG. 3B by irradiating of the light by the polarization light source 140. The virtual polarization surface formed by actual light irradiation of the polarization light source 140 will be referred to as an acquired polarization surface Fp.

For example, when the movable body is positioned in a vertical lower part of the polarization light source 140, the virtual polarization surface may be formed in a vertical shape, but when the movable body is positioned at a place other than the vertical lower part of the polarization light source, the virtual polarization surface may be formed in an inclined shape as illustrated in the FIG. 2B. For comparison with the acquired polarization surface, the virtual polarization surface formed when the movable body is positioned in the vertical lower part of the polarization light source 140 will be referred to as a reference polarization surface Fp'. Information on the reference polarization surface Fp' may be prestored and managed in the storage unit provided in the recognition unit 100.

In the acquired polarization surface Fp, a virtual line segment contacting one predetermined surface (the predetermined surface is assumed as F1 which is a first surface) of the 3D figure at which the polarization module 110 is positioned and made. The corresponding line segment is expressed as an intersection line vector $\overline{F_{p1}}$ Herein, a virtual line segment may be recognized by the interpretation unit 130 by using the illumination value information generated when the light transmitting the polarization module 110 is received by the illumination module 120.

In this case, when three surfaces at which the polarization modules 110 are positioned in the 3D figure respectively are considered, at least 2 or at most 3 intersection line vectors which are tangents of the acquired polarization surface and the respective surfaces may be acquired. When an outer product between two intersection line vectors among the intersection line vectors is performed, an acquired normal vector $\overline{F_{p2}}$ which is a vector vertical to the acquired polarization surface Fp is calculated. The reason is that 2 or 3 intersection line vectors which are the tangents of the respective surfaces exist on one acquired polarization surface Fp. Of course, the number of intersection line vectors acquired when the shape of the 3D figure considered is a shape other than the right-angled tetrahedron may vary.

Since information on the reference polarization surface Fp' and a reference normal vector $\overline{F_{p3}}$ which is the vector vertical to the reference polarization surface Fp are prestored and managed in the storage unit, the interpretation unit 130 may calculate the inclination angle Tp in the 3D space between an acquired normal vector $\overline{F_{p2}}$ calculated during such a process and the reference normal vector $\overline{F_{p3}}$ and when the acquired polarization surface rotates as large as the inclination angle Tp in the 3D space, the reference polarization surface and the acquired polarization surface coincide with each other.

When a coincidence operation of the reference polarization surface and the acquired polarization surface is completed (that is, a preliminary operation for interpreting the posture of the movable body is completed by assuming the case where the movable body is positioned in the vertical lower part of the polarization light source 140, a posture candidate group for generating the posture information of the movable body may be determined.

Figure 4:
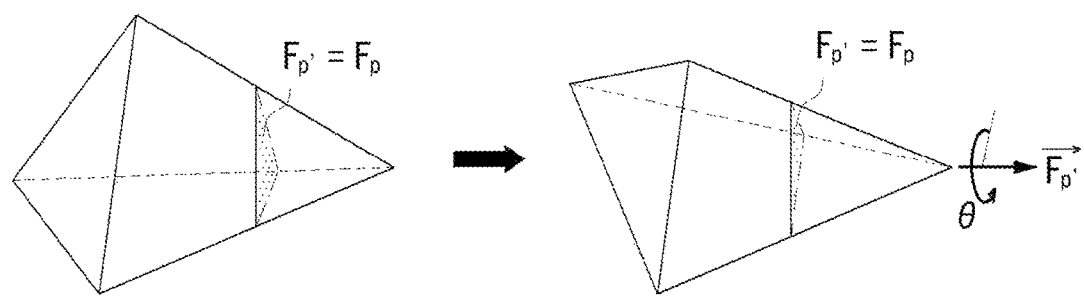
Figure 5:
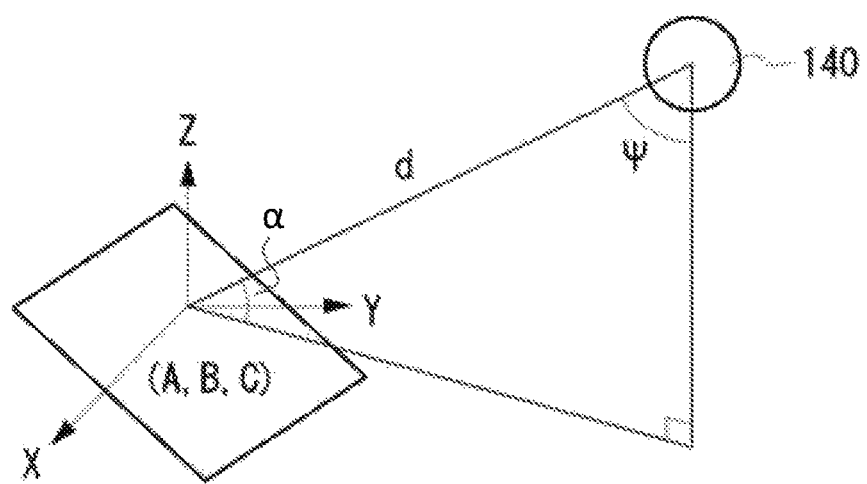

In this case, when the movable body (that is, the 3D figure determined by the polarization module 110 attached to the movable body) rotates around the reference normal vector $\overrightarrow{F_{s1}}$ which is vertical to the reference polarization surface while the reference polarization surface (coincides with the acquired polarization surface through 3D rotation) is recognized as a virtual cutting surface cutting the 3D figure as illustrated in the FIG. 4, the inclination angle of the intersection line vector on three surfaces to be considered is not changed, but the posture of the movable body is changed. As a result, the posture information of the movable body is specified as a posture candidate group while the inclination angle of the intersection line vector on the three surfaces is not changed.

Accordingly, the posture information of the movable body may be confirmed only by further determining at which angle the movable body rotates with respect to the posture candidate group.

Hereinafter, a process in which the interpretation unit 130 confirms the posture information of the movable body with respect to the posture candidate group will be described in brief.

First, the interpretation unit 130 may recognize the amount (illumination value) of light which reaches the considered target surfaces by using the illumination value information provided from the illumination module 120. Further, the interpretation unit 130 may calculate a ratio of the illumination values of the respective considered target surfaces.

Accordingly, the interpretation unit 130 may acquire the posture information of the movable body by using Equation 1 given below, which is a conversion equation to rotate at a rotational angle θ by using the reference normal vector $\overrightarrow{F_{s1}}$ as a central axis.

$$\frac{\begin{bmatrix} A_1\cos\theta - B_1\sin\theta \\ B_1\cos\theta + A_1\sin\theta \\ C_1 \end{bmatrix} \cdot \vec{l}}{\begin{bmatrix} A_2\cos\theta - B_2\sin\theta \\ B_2\cos\theta + A_2\sin\theta \\ C_2 \end{bmatrix} \cdot \vec{l}} = \frac{s_1}{s_2} \quad \text{[Equation 1]}$$

In the equation 1, $\vec{l}$ represents the direction vector of introduced light, s1 represents an illumination value of a first considered target surface, $(A_1, B_1, C_1)$, represents an area vector of the first considered target surface after rotating as the inclination angle Tp, s2 represents the illumination value of a second considered target surface, and $(A_2, B_2, C_2)$ represents the area vector of the second considered target surface after rotating at the inclination angle Tp. The interpretation unit 130 may calculate the illumination value of the considered target surface, for example, an output value of each illuminometer included in the illumination module 120 by using predetermined methods including arithmetic summation, weight application summation, multiplication calculation, and the like.

Since s1, s2, $\vec{l}$, $(A_1, B_1, C_1)$, and $(A_2, B_2, C_2)$ are known, while only the rotational angle θ is an unknown quantity, the interpretation unit 130 may calculate the rotational angle θ by using the equation 1 and store the calculated rotational angle θ in the storage unit as the posture information of a rotational body.

The interpretation unit 130 may calculate the location information by using the illumination value information provided from the illumination module 120. Hereinafter, a location information calculating process will be described in brief with reference to the FIG. 5.

When three considered target surfaces are selected in the posture information interpretation process, the area vector $(A_i, B_i, C_i)$ of each considered target surface may be expressed as an equation of each plane as shown in equation 2 given below.

$$A_i x + B_i y + C_i z = 0 \quad \text{[Equation 2]}$$

Where i is a factor for specifying each considered target surface and when the number of considered target surfaces is 3, i may be 1, 2, or 3.

When it is assumed that the location of the polarization light source 140 is (0, 0, 0) and the location of the movable body is (x, y, z), the location of the movable body may be determined by using Equations 3 to 6 given below.

In this case, a location relationship, between the amount and the light source of the light which reaches the recognition unit 100, is constituted by three elements. A first element is a distance (that is, f(d), see Equation 3 given below) between the polarization light source 140 and the movable body. A second element indicates at which angle each of the considered target surfaces is inclined with respect to the polarization light source 140 (that is, g(α), see Equation 4 given below). A third element indicates that light is evenly emitted from the polarization light source 140 in a spherical shape (see the equation 5 given below).

$$f(d) = \frac{k}{d^2} = \frac{k}{\left(\sqrt{x^2 + y^2 + z^2}\right)^2} = \frac{k}{x^2 + y^2 + z^2} \quad \text{[Equation 3]}$$

Where k represents a predetermined constant.

$$g(\alpha) = \cos(\alpha) = \frac{(A, B, C) * (x, y, z)}{\sqrt{A^2 + B^2 + C^2}\sqrt{x^2 + y^2 + z^2}} \quad \text{[Equation 4]}$$

$$h(\psi) = \cos(\psi) = \frac{z}{\sqrt{x^2 + y^2 + z^2}} \quad \text{[Equation 5]}$$

Herein, the equation 5 is used for assuming that the polarization light source 140 is continuously positioned on a ceiling and the polarization light source 140 evenly emits the light in a hemispheric shape.

An illumination value s of the polarization module 110 may be calculated by the multiplication calculation of the equations 3 to 5.

$$s = f(d)g(\alpha)h(\psi) \quad \text{[Equation 6]}$$

-continued $$= \frac{kz}{\sqrt{A^2+B^2+C^2}\,(x^2+y^2+z^2)^2}(A, B, C)\cdot(x, y, z)$$

$$= \frac{kz}{\sqrt{A^2+B^2+C^2}\,(x^2+y^2+z^2)^2}(Ax+By+Cz)$$

An equation expressed by the equation 6 is derived with respect to each considered target surface. Herein, s, k, and $(A_i, B_i, C_i)$ are previously known values, while x, y and z for determining the location of the movable body are unknown quantities.

However, the interpretation unit 130 may calculate three unknown quantities x, y, and z by using simultaneous equations using three equations for each considered target surface expressed by the equation 6. Consequently, the positional information may be calculated and stored in the storage unit.

As described above, the recognition unit 100 according to the exemplary embodiment receives the light emitted from the polarization light source 140 to calculate the information on the movable body, that is, the posture information and the location information of the movable body.

It is natural that the movable body information recognition method may be performed by an automated procedure according to a time series order by a program embedded or installed in a digital processing device, and the like. Codes and code segments constituting the program may be easily inferred by a computer program in the art. Further, the program is stored in computer readable media which the digital processing device may read and read and executed by the digital processing device to implement the method. The computer readable media include a magnetic storage medium, an optical storage medium, and a carrier wave medium.

The present invention has been described with reference to the exemplary embodiments. However, it will be appreciated by those skilled in the art that various modifications and changes of the present invention can be made without departing from the spirit and the scope of the present invention which are defined in the appended claims.

What is claimed is:

1. A device for recognizing a 3D posture and a location of a movable body, the device comprising:
    a plurality of polarization modules individually attached to a plurality of surfaces of a 3D figure;
    a plurality of illumination modules, individually corresponding to the polarization modules, configured to generate and output illumination value information in which polarized light emitted from a polarization light source penetrates the corresponding polarization module to be received; and
    an interpretation unit configured to generate posture information and location information of the movable body by using the illumination value information received from the illumination modules corresponding to the polarization modules attached to at least three considered target surfaces,
    wherein a condition is met, in which three considered target surfaces selected among the plurality of surfaces of the 3D figure exist at a location to which the light emitted from the polarization light source is irradiated and an area vector of the other one considered target surface is not made through synthesis of the area vectors of two other considered target surfaces.

2. The device of claim 1, wherein each of the plurality of polarization modules includes a plurality of polarization units in which optical transmission axes are set differently from each other.

3. The device of claim 1, wherein generate the posture information of the movable body comprises:
    rotate an acquired polarization surface formed by the polarized light emitted from the polarization light source in the 3D figure at an inclination angle Tp in a 3D space so as to coincide with a prestored reference polarization surface, and
    generate the posture information of the movable body by using an equation given below, which uses the illumination value information for two considered target surfaces among the three considered target surfaces, $$\frac{\begin{bmatrix} A_1\cos\theta - B_1\sin\theta \\ B_1\cos\theta + A_1\sin\theta \\ C_1 \end{bmatrix}\cdot \vec{l}}{\begin{bmatrix} A_2\cos\theta - B_2\sin\theta \\ B_2\cos\theta + A_2\sin\theta \\ C_2 \end{bmatrix}\cdot \vec{l}} = \frac{s_1}{s_2}$$

where $\vec{l}$ represents direction vector of introduced polarized light, s1 represents an illumination value measured with respect to a first considered target surface, $(A_1, B_1, C_1)$ represents an area vector of a first considered target surface after rotating as the inclination angle Tp, s2 represents measured illumination value of a second considered target surface, and $(A_2, B_2, C_2)$ represents the area vector of the second considered target surface after rotating at the inclination angle Tp, and $\theta$ represents a rotational angle indicating the posture information of the movable body.

4. The device of claim 1, generate the location information of the movable body comprises:
    rotate an acquired polarization surface formed by the polarized light emitted from the polarization light source in the 3D figure at an inclination angle Tp in a 3D space so as to coincide with a prestored reference polarization surface, and
    generate the positional information of the movable body by using an equation given below, which uses the illumination value information for three considered target surfaces, $$s_i = \frac{kz}{\sqrt{A_i^2+B_i^2+C_i^2}\,(x^2+y^2+z^2)^2}(A_i x + B_i y + C_i z)$$

where i is designated as 1, 2, or 3 corresponding to each of three considered target surfaces, k represents a predetermined constant, $(A_i, B_i, C_i)$ represents area vector of three considered target surfaces, (x, y, z) represent the location information of the movable body when a location coordinate of the polarization light source is designated as (0, 0, 0), and $s_i$ represents an illumination value of each of the three considered target surfaces.

5. The device of claim 1, wherein the 3D figure is a concrete 3D figure attached to the movable body to which the polarization module is attached, wherein the 3D figure is a virtual 3D figure formed by virtually extending each considered target surface to which the polarization module is attached.

6. A method for recognizing a 3D posture and a location of a movable body, the method comprising:
generating and outputting, by a plurality of illumination modules, illumination value information in which polarized light emitted from a polarization light source penetrates polarization modules to be received; and
generating by an interpretation unit posture information and location information of the movable body by using the illumination value information received from the illumination modules corresponding to the polarization modules attached to at least three considered target surfaces of a 3D figure,
wherein a condition is met, in which three considered target surfaces selected among the plurality of surfaces of the 3D figure exist at a location to which the light emitted from the polarization light source is irradiated and an area vector of the other one considered target surface is not made through synthesis of the area vectors of two other considered target surfaces.

7. The method of claim 6, wherein each of the polarization modules includes a plurality of polarization units in which optical transmission axes are set differently from each other.

8. The method of claim 6, wherein generating the posture information of the movable body comprises:
rotating an acquired polarization surface formed by the polarized light emitted from the polarization light source in the 3D figure at an inclination angle Tp in a 3D space so as to coincide with a prestored reference polarization surface, and
generating the posture information of the movable body by using an equation given below, which uses the illumination value information for two considered target surfaces among the three considered target surfaces, $$\frac{\begin{bmatrix} A_1\cos\theta - B_1\sin\theta \\ B_1\cos\theta + A_1\sin\theta \\ C_1 \end{bmatrix} \cdot \vec{l}}{\begin{bmatrix} A_2\cos\theta - B_2\sin\theta \\ B_2\cos\theta + A_2\sin\theta \\ C_2 \end{bmatrix} \cdot \vec{l}} = \frac{s_1}{s_2}$$

where $\vec{l}$ represents direction vector of introduced polarized light, s1 represents an illumination value measured with respect to a first considered target surface, $(A_1, B_1, C_1)$ represents an area vector of a first considered target surface after rotating as the inclination angle Tp, s2 represents measured illumination value of a second considered target surface, and $(A_2, B_2, C_2)$ represents the area vector of the second considered target surface after rotating at the inclination angle Tp, and θ represents a rotational angle indicating the posture information of the movable body.

9. The method of claim 6, generating the location information of the movable body comprises:
rotating an acquired polarization surface formed by the polarized light emitted from the polarization light source in the 3D figure at an inclination angle Tp in a 3D space so as to coincide with a prestored reference polarization surface, and
generating the positional information of the movable body by using an equation given below, which uses the illumination value information for three considered target surfaces, $$s_i = \frac{kz}{\sqrt{A_i^2 + B_i^2 + C_i^2} \, (x^2 + y^2 + z^2)^2} (A_i x + B_i y + C_i z)$$

where i is designated as 1, 2, or 3 corresponding to each of three considered target surfaces, k represents a predetermined constant, $(A_i, B_i, C_i)$ represents area vector of three considered target surfaces, (x, y, z) represent the location information of the movable body when a location coordinate of the polarization light source is designated as (0, 0, 0), and $s_i$ represents an illumination value of each of the three considered target surfaces.

10. The method of claim 6, wherein the 3D figure is a concrete 3D figure attached to the movable body to which the polarization module is attached, wherein the 3D figure is a virtual 3D figure formed by virtually extending each considered target surface to which the polarization module is attached.

* * * * *